(12) United States Patent
Rell, III et al.

(10) Patent No.: US 10,608,763 B2
(45) Date of Patent: Mar. 31, 2020

(54) BUILT-IN SELF-TEST FOR RECEIVER CHANNEL

(71) Applicant: International Business Machines Corporation, Armonk, NY (US)

(72) Inventors: John G. Rell, III, Austin, TX (US); Michael W. Harper, Round Rock, TX (US); Mack W. Riley, Austin, TX (US); Michael B. Spear, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 15/988,869

(22) Filed: May 24, 2018

(65) Prior Publication Data

US 2019/0363813 A1  Nov. 28, 2019

(51) Int. Cl.
*H04J 3/06*     (2006.01)
*H04L 7/04*     (2006.01)
*H04B 17/29*    (2015.01)

(52) U.S. Cl.
CPC .......... *H04J 3/0658* (2013.01); *H04B 17/29* (2015.01); *H04L 7/042* (2013.01)

(58) Field of Classification Search
CPC ......... H04J 3/0658; H04B 17/29; H04L 7/042
USPC ................ 370/464, 498, 503, 509
See application file for complete search history.

(56) References Cited

U.S. PATENT DOCUMENTS

| | | | |
|---|---|---|---|
| 8,521,510 B2 | 8/2013 | Gilbert et al. | |
| 9,318,110 B2 | 4/2016 | Roe | |
| 2007/0220383 A1* | 9/2007 | Kiryu | G01R 31/31724 714/726 |
| 2008/0013615 A1* | 1/2008 | Blanc | H04L 1/20 375/225 |
| 2015/0198661 A1* | 7/2015 | Gerowitz | G01R 31/317 324/762.02 |
| 2016/0117310 A1 | 4/2016 | Hager | |

* cited by examiner

*Primary Examiner* — Obaidul Huq
(74) *Attorney, Agent, or Firm* — Patterson + Sheridan, LLP

(57) ABSTRACT

Method and apparatus for packeted analysis, comprising: testing a phase rotator at a plurality of phase rotator positions, by propagating a first series of bits of a first pattern through a channel of an integrated circuit; propagating a second series of bits of a second pattern through the channel; measuring, for the given phase rotator position, a value of each bit propagated through the channel; and in response to determining that measured values of the bits propagated through the channel conform to one of the first pattern and the second pattern, indicating that the given phase rotator position satisfies an accuracy threshold; determining a sequence of phase rotator positions of the plurality of phase rotator positions in which the accuracy threshold is satisfied; and in response to determining that the sequence of phase rotator positions does not satisfy an eye width threshold, failing the channel of the integrated circuit.

20 Claims, 8 Drawing Sheets

BUILT-IN SELF-TEST FOR RECEIVER CHANNEL

BACKGROUND

The present disclosure relates to self-test of integrated circuits, and more specifically, to a self-test of a receiver channel employing a phase rotator. Built-In Self-Test (BIST) is a feature of many Integrated Circuits (IC) that tests whether various components in the IC are functioning properly. Known inputs are fed into the portions of the IC being tested, and the outputs are checked to determine whether expected values are produced. When determining whether an analog portion of an IC (such as a signal receiver) functions properly, the channel or data path in which the signal is carried in the IC is tested, however, where in the signal that the evaluation is made can affect the result of the measurement, and a phase rotator (also referred to as a phase shifter) in the IC is typically tested to ensure that the built-in self-test evaluates a signal across several positions in the waveform.

SUMMARY

According to one embodiment of the present disclosure, a method for packeted analysis is provided, comprising: testing a phase rotator at a plurality of phase rotator positions, wherein testing the phase rotator at a given phase rotator position of the plurality of phase rotator positions comprises: propagating a first series of bits of a first pattern through a channel of an integrated circuit; propagating a second series of bits of a second pattern through the channel; measuring, for the given phase rotator position, a value of each bit propagated through the channel; and in response to determining that measured values of the bits propagated through the channel conform to one of the first pattern and the second pattern, indicating that the given phase rotator position satisfies an accuracy threshold; determining a sequence of phase rotator positions of the plurality of phase rotator positions in which the accuracy threshold is satisfied; and in response to determining that the sequence of phase rotator positions does not satisfy an eye width threshold, failing the channel of the integrated circuit.

According to another embodiment of the present disclosure, a circuit with packeted analysis built-in self-test functionality is provided, comprising: a receiver channel; a pattern generator, in communication with the receiver channel, that propagates a series of bits according to a pattern of nominal values during Built-In Self-Test (BIST) onto the receiver channel, wherein each bit of the series of bit has a known nominal value; a sampler, in communication with the receiver channel, that samples each bit propagated onto the receiver channel in response to a clock signal to sequentially determine measured values for the series of bits; a result register, configured to store a result signal generated during BIST; a phase rotator, in communication with the sampler and the result register, including a plurality of phase shift positions, wherein each phase shift position of the plurality of phase shift positions, when active, imparts a different phase shift on the clock signal; a test logic circuit, in communication with the pattern generator and the phase rotator, that during BIST is configured to: in response to setting which phase shift position of the plurality of phase shift positions is active, signal the pattern generator to propagate the series of bits; compare the measured values of the bits to the nominal values of the bits sampled at a given phase shift position of the plurality of phase shift positions to determine whether the given phase shift position satisfies an accuracy threshold; and determine whether a number of sequential phase shift positions of the plurality of phase shift positions that satisfy the accuracy threshold satisfy an eye width threshold.

According to a further embodiment of the present disclosure, a method for packeted analysis built-in self-test is provided, comprising: comparing a sequence of measured values for a series of bits against a sequence of nominal values for the series of bits, wherein the sequence of measured values are sampled from a signal according to a sample clock signal phase shifted according to an active phase shift position of a plurality of phase shift positions; determining that a given phase shift position of the plurality of phase shift positions satisfies an accuracy threshold in response to the sequence of measured values matching the sequence of nominal values; and determining whether a number of phase shift positions of the plurality of phase shift positions satisfy an eye width threshold based on a number of sequential phase shift positions of phase shift positions satisfying the accuracy threshold.

DETAILED DESCRIPTION

Built-In Self-Test (BIST) is a feature of many Integrated Circuits (IC) that tests whether various components in the IC are functioning properly. To ensure that a phase rotator is properly functioning in addition to the data paths in the IC, the present disclosure provides systems and methods for BIST that check several Unit Intervals (UI) across several positions of a phase rotator via two or more interleaved patterns. In one embodiment, two patterns are interleaved via a half-rate sampler, and up to three UI are checked to verify that the measured signals match the patterns across a defined eye width. It will be appreciated that the number of patterns measured and the number of UI checked against may vary from the example embodiments discussed herein (e.g., for double-checking, greater accuracy, various signal characteristics), and the proffered examples are not limiting of the scope of the present disclosure. The present disclosure fully tests the phase rotator, and enables both synchronous and asynchronous BIST.

For BIST according to several example embodiments of the present disclosure, two patterns are interleaved with one another to create a signal set with inherent "eyes" in a time sequence of the UIs that are analyzed. In a packeted analysis, as described herein, the patterns of nominal values are overlaid with a repeating key sequence to allow for the edges between the UI to be detected without needing to track state logic or impart "jitter" or other interference. Stated differently, packeted analysis uses neither jitter nor edge detection logic in determining the characteristics of signal eyes. Data are sampled from the channel being tested and assembled into packets for evaluation against the known values of the interleaved patterns. Once a signal in a given UI is matched to a pattern, a deviation in the measured values from the nominal values of the pattern (or completion of the pattern) is used to identify the edge of the UI and the start of the next UI. The phase rotator may be incremented through each position for up to three UI so that every phase position is tested during BIST. A given channel, or the IC, may be passed or failed under BIST based on a number of sequential phase positions available to the phase rotator in each UI that are matched between the measured and nominal values of the pattern.

Figure 1:
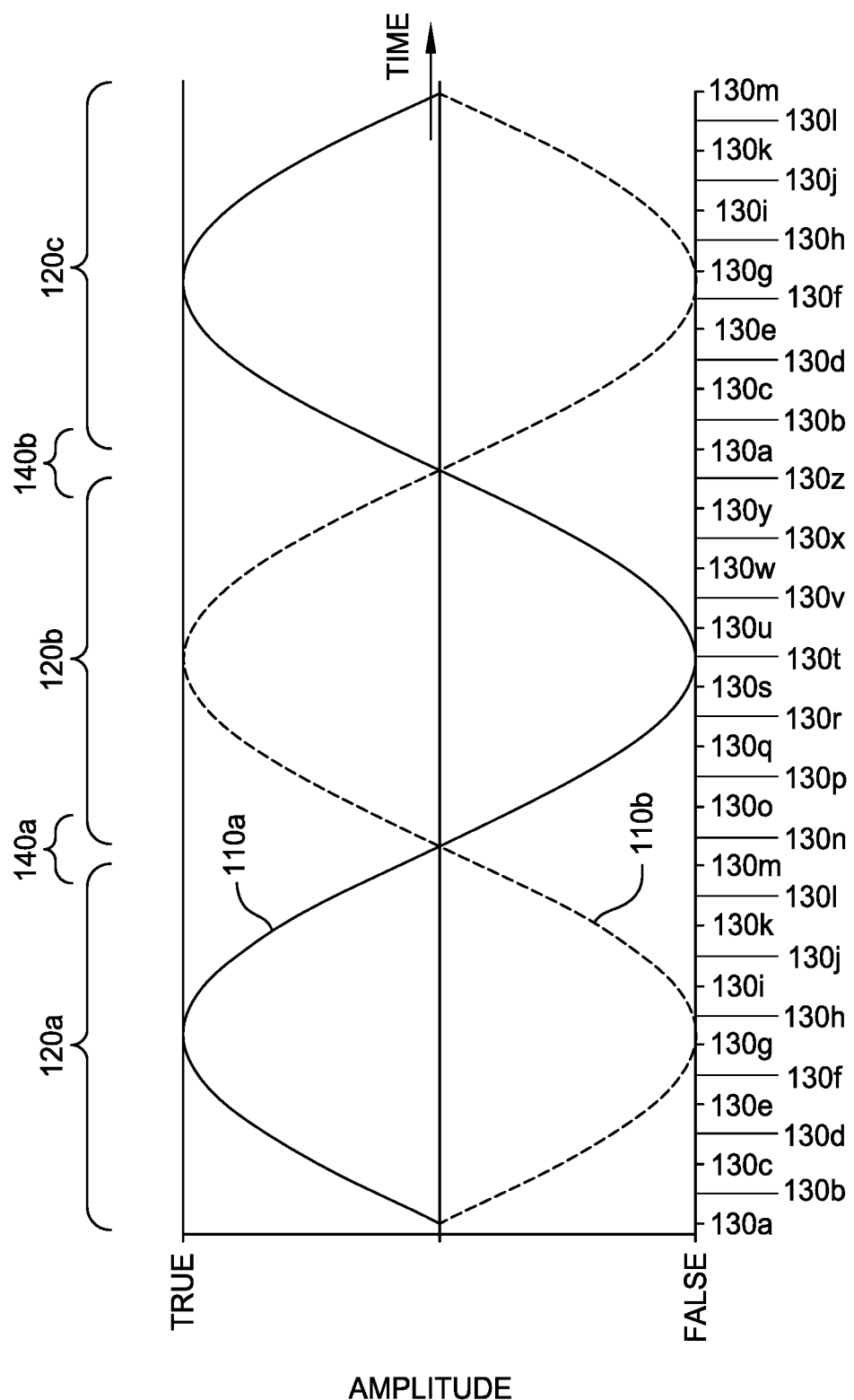
FIG. 1 illustrates an example waveform measured according to an aspect of the present disclosure.

With reference now to FIG. 1, an example eye diagram 100 as may be measured as part of a BIST is illustrated. An eye diagram 100 is a histogram that shows the amplitudes of one or more waveforms tracked over time. The eye diagram 100 in FIG. 1 illustrates a first signal 110a and a second signal 110b (generally, signals 110) having sinusoidal forms, that fluctuate in amplitude from a value associated with binary TRUE to a value associated with binary FALSE, although other waveforms are possible. The second signal 110b is defined in the illustrated waveform graph of the example eye diagram 100 as the compliment to the first signal 110a, although the second signal 110b may have other forms than the compliment to the first signal 110a in various embodiments.

Three eyes 120a-c (generally, eyes 120) are illustrated in the eye diagram 100 that correspond to a given binary value carried by the signals 110. Each eye 120 represents a Unit Interval (UI) of the time in which a single bit is transmitted via the associated signal 110. For example, the first eye 120a and the third eye 120c correspond to the portions of the first signal 110a that carries a bit of a nominal value of binary TRUE (and the complement second signal 110b that carries a bit of a nominal value of binary FALSE). Similarly, the second eye 120b corresponds to the portion of the first signal 110a that carries a bit of a nominal value of binary FALSE (and the portion of the complement second signal 110b that carries a bit of a nominal value of binary TRUE). Although three eyes 120 are illustrated in the example eye diagram 100, it will be appreciated that depending on where in the signal's phase an initial reading is taken may result in an eye diagram 100 with 2.X eyes 120; i.e., a first eye 120a may be a partial eye 120. Accordingly, in embodiments that use more than two signals 110, more than three eyes 120 may be measured to account for several signals 110 being measured at a phase that does not initially produce a full eye 120 in the waveform graph 100. Additionally, in some embodiments, more than three eyes 120 may be measured to account for the double-checking of results, increasing the accuracy thresholds with a given sequence length, testing signals 110 with different characteristics (e.g., waveforms, frequencies, value patterns of bits), and the like.

As used herein, bits are described as having a nominal binary value of either TRUE or FALSE, which may be represented by a binary digit 1 or a binary digit 0 in a string of binary values. A digitizer or signal interpreter analyzes the signal carrying the binary value to determine what the measured binary value is. Various embodiments use various aspects of a signal to determine the binary value carried in a given portion of a signal, including, but not limited to, a measured amplitude, an amplitude shift, a phase shift, a frequency shift, etc. As discussed herein, the measured values of the bits may match or differ from the nominal values thereof, and a measured value may be designated by a superscript "m" while a nominal value may be designated by a superscript "n" (or no superscript). For example, a given bit may nominally be set to $1^n$, and may be measured as either $1^m$ or $0^m$; indicating a correct reading or an incorrect reading of the value of that given bit respectively. As will be appreciated, depending on the signal measured and the settings of the digitizer or signal interpreter, the nominal binary value may be interpreted correctly or incorrectly. For example, when an amplitude of 1V is set to correspond to binary TRUE and an amplitude of 0V is set to correspond to binary FALSE, a reading taken at 0.5V may be interpreted as $1^m$ or $0^m$, which may or may not correspond to the nominal value.

Strings of binary values are represented herein as a series of 1s and 0s, followed by a subscript "2" to indicate that the number is a base two notation, such as, for example: $0000_2$ and $1111_2$, which represent zero (0) and fifteen (15) in base ten, respectively. Individual bits within a bit sequence are referred to with respect to a position in the sequence, and various bit numbering and indexing schemes may be used in various embodiments. As used herein, a series of bits is indexed starting at $bit_1$ at the rightmost position in the series of bits. For example, in the indexing and numbering scheme used herein, in the four-bit series of $0001_2$, $bit_1$ is set to a value of TRUE/1, although it will be appreciated that $bit_1$ may variously be identified as $bit_0$, $bit_4$, or $bit_3$ in other numbering and indexing schemes (e.g., big endian vs. little endian, 0 or 1 indexing). As will be appreciated, although sequences of a given number of bits are used in examples herein, longer or shorter sequences of bits may be used in the various embodiments of the present disclosure.

Illustrated along the time axis of the eye diagram 100 are a series of hashes that represent various phase positions 130a-z (generally, phase positions 130) in the signals 110 at which time the signals 110 may be measured. In the illustrated example, thirteen hashes are illustrated in each eye 120 that each correspond to a given phase position 130 in the signal 110. A phase rotator may adjust what phase position 130 the signal 110 is measured at by adjusting a timing delay or phase shift of a clock signal used to define when a value is sampled from the signal 110 for measurement. For example, a sample of the signals 110 may be taken at a first phase position 130a, a second phase position 130b, a third phase position 130c, etc., which may each have a different measured value for the signal 110. In the illustrated example in FIG. 1, the phase rotator has twenty six available phase positions 130 (corresponding to phase positions 130a-m in the first eye 120a and the third eye 120c, and to phase positions 130n-z in the second eye 120b). It will be appreciated that phase rotators may have a different number of available phase positions 130 than that discussed in relation to the example eye diagram 100 of FIG. 1.

As will be appreciated, the amplitude of the illustrated signals 110 switches over time, which may be interpreted to reflect different values of bits carried by the signals 110. The amplitude of the analog signal 110 is mapped to the binary value carried by the signal 110, and as the signal nears the midpoint between the amplitude assigned for interpretation as binary TRUE and the amplitude assigned for interpretation as binary FALSE, the accuracy at which the nominal value carried by the signal is measured decreases. The regions of the eyes 120 that the accuracy of the values "blur" (e.g., are close to a midpoint between binary values) are generally referred to herein as edges 140. In the illustrated example, a first edge 140a exists between the first eye 120a and the second eye 120b, and a second edge 140b exists between the second eye 120b and the third eye 120c.

When the signals 110 are measured at values that are near the midpoint between the values associated with binary TRUE and binary FALSE, such as at the positions shown in the edges 140, the nominal value carried by those signals 110 may be interpreted as either binary TRUE or binary FALSE; resulting in a potential misinterpretation of the nominal value. To mitigate the risk of misinterpretation based on the phase at which the signal 110 is measured, BIST performed according to aspects of the present disclosure discovers the edges 140. During BIST, a phase rotator may induce a time difference from a clock signal at which to measure the value of the signal 110 to measure the signal 110 at several positions in the waveform. After BIST, the phase positions 130 and edges 140 within the waveform may be used to determine whether an eye 120 is large enough to accurately measure signals 110.

During BIST, a phase rotator that operates independently of the sampling clock may be tested to determine the number of phase positions 130 that can reliably measure a value carried by a signal 110 that corresponds to the nominal value thereof. As used herein, the number of sequential phase positions 130 in which the measured value corresponds to the nominal value is referred to as an eye width. Depending on the eye width measured, a given channel or a phase rotator may be identified as passing or failing BIST. For example, if a minimum eye width of eight consecutive phase positions 130 is used, and phase positions 130c-n (twelve sequential phase positions 130) pass, an eye width of twelve phase positions 130 will have been observed, and a passing result will be noted. In another example, with a minimum eye width of eight consecutive phase positions 130, if phase positions 130b-h (seven sequential phase positions 130) and phase positions 130j-n (five sequential phase positions 130) pass, a failing result will be noted as no continuous sequence of phase positions 130 satisfied the eye width threshold. As will be appreciated, an eye width threshold may be set based on the number or available phase positions 130 in a phase rotator. For example, an eye width threshold may be set from about 0.1 n to about 0.5 n phase positions 130 for a phase rotator with n positions.

After BIST, with a failing result, a given channel tested may be identified so that it is not used during regular (non-BIST) operation or the IC may be marked as failing and not placed into regular operation. Failing a given channel does not necessarily result in a given IC failing BIST. For example, in an IC including N channels and with N−1 channels marked as passing, the one failing channel may be powered down, disconnected, or otherwise designated to not be used so that the IC may pass BIST. Similarly, passing a given channel does not necessarily result in the IC passing BIST. A threshold may specify a given number of channels that shall pass BIST for the IC to also pass BIST.

Figure 2:
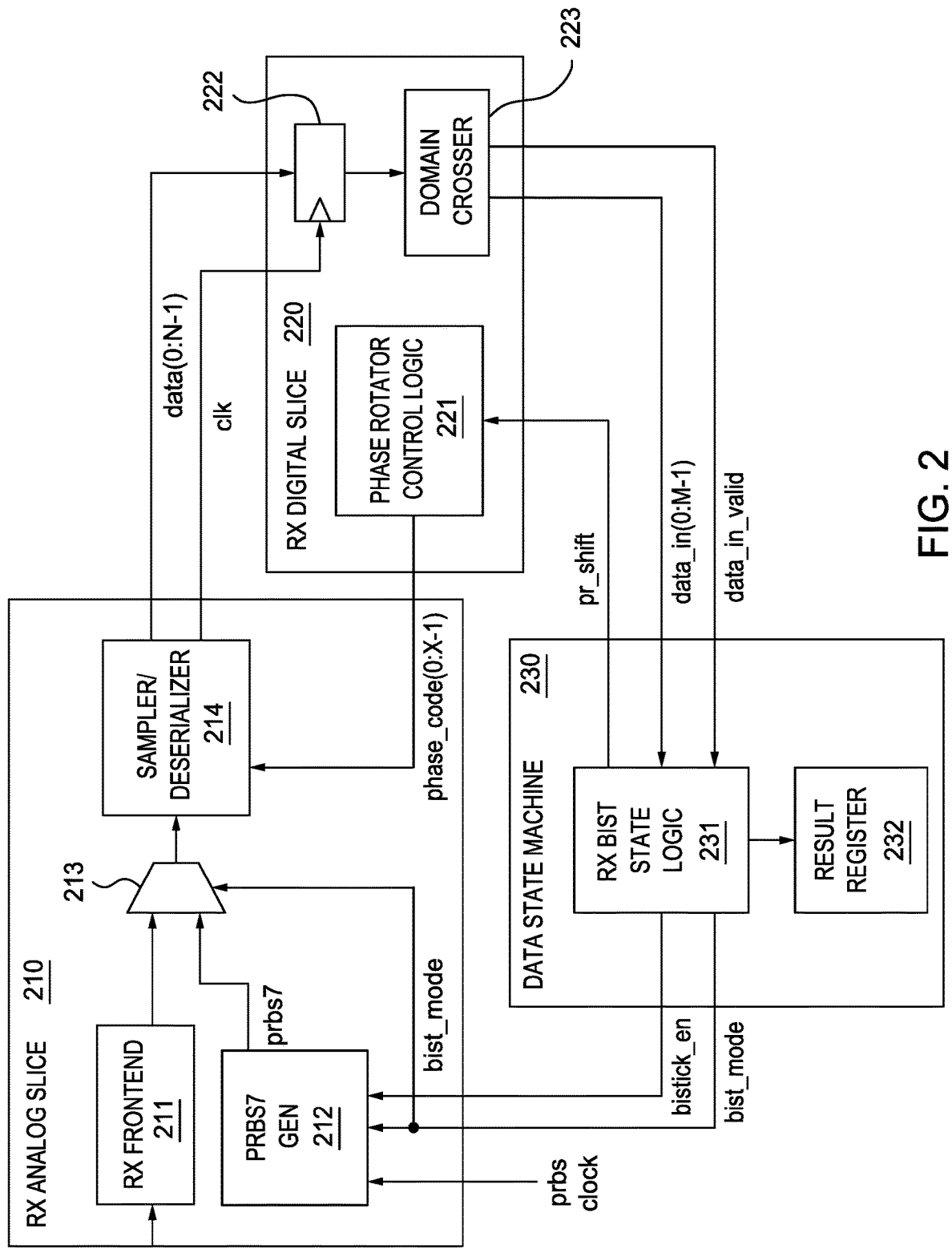
FIG. 2 illustrates an example integrated circuit with built-in self-test functionality according to an aspect of the present disclosure.

FIG. 2 illustrates an example integrated circuit 200 with built-in self-test functionality. The example integrated circuit 200 includes an analog portion 210, a digital portion 220, and BIST state machine portion 230. It will be appreciated that the example IC 200 discussed herein may include additional elements to those shown in FIG. 2, and the given portions are recited for ease of explanation, but may be co-integrated on the IC 200 depending on the circuit layout. Each of the elements illustrated and discussed in the example IC 200 may be implemented as a discrete electrical component or combination of discrete electrical components, including, but not limited to, logic gates, memory storage devices, wiring, and the like.

The illustrated analog portion 210 includes a receiver 211 and a pseudo-random sequence generator 212 that are connected by a multiplexer 213 to a sampler 214. During non-BIST operation of the example IC 200, the receiver 211 receives external inputs for interpretation, but during BIST operation, values are supplied by the pseudo-random sequence generator 212 for interpretation. In a half-rate embodiment, the pseudo-random sequence generator 212 generates a pattern (pattern$_A$) and interleaves a complementary pattern (pattern$_B$) with the original pattern. Stated differently, in the above example of interleaved patterns of bits$_{1-14}$, the odd bits (bit$_1$, bit$_3$, bit$_5$, etc.) correspond to the value 0″ or 1″ set according to pattern$_A$, and the even bits (bit$_1$, bit$_4$, bit$_6$, etc.) correspond to the inverse/complementary values (1″ or 0″) of the odd bits. The multiplexer 213 receives input from one of the receiver 211 and the pseudo-random sequence generator 212, and forwards the input to the sampler 214.

The sampler 214 may interpret the values of the signals 110 it receives from the multiplexer 213 and, in BIST mode, may de-serialize those values to create packets of bits that may be analyzed asynchronously from the clock signal at which the sampler 214 measures the values from the signal 110. Each packet includes a series of bits measured at one phase position 130 setting of the signal 110 that are evaluated during BIST for consistency against pattern$_A$ and pattern$_B$.

The illustrated digital portion 220 includes phase rotator control logic 221, which is in communication with the sampler 214; a sampler latch 222, which receives data and a clock signal from the sampler 214; and (optionally) a domain crosser 223 that receives data from the sampler latch 222 and communicates the data to the BIST state machine portion 230.

The phase rotator control logic 221 may control the offset of a phase rotator for signal sampling. The phase rotator controls a sampling clock signal that is timed independently from the signal generation clock signal used the pseudo-random sequence generator 212 so that the phase position 130 in the signal 110 may be moved in subsequent samples. For a phase rotator capable of n different phase positions 130, the phase rotator control logic 221 sequentially steps the phase rotator through each available phase position 130 from 1 to n, and may continue stepping the phase rotator through phase positions 130 from 1 to n/2 (or beyond in various embodiments). Stated differently, a phase rotator may be rotated up to 1.5 times through the available phase positions 130 when sampling up to three eyes 120 of the signals 110. Thus a phase rotator may be rotated through phase positions 130 from 0π to 3π radians, corresponding to the three eyes 120 illustrated in FIG. 1. In embodiments that capture more than three eyes 120, the phase rotator may rotate through phase positions 130 beyond 3π radians.

The sampler latch 222 receives the data sampled from the signal 110 by the sampler 214 and a clock signal to organize the deserialized data into a packet for later analysis. As the number of bits in the packet increases during deserialization, the sampler latch 222 and the domain crosser 223 may reorganize and validate the data received for transmission to the state machine portion 230.

The illustrated BIST state machine portion 230 includes the state logic 231, which is used to enable and control BIST mode for the IC 200; and a result register 232, used to indicate whether the BIST passes or fails for a given channel in the IC 200. The state logic 231 controls whether BIST mode is engaged, and communicates with the pseudo-random sequence generator 212 and the multiplexer 213 to generate and accept the BIST data for analysis. Additionally, the state logic 231 controls whether flags are written to or cleared in the result register 232 to indicate to observers whether individual channels of the IC 200 as a whole has passed or failed BIST.

The state logic 231 receives a packet of data for a given phase rotator position, and compares the measured values for the data in the packet against the nominal values for those data to determine whether the given phase position 130 has accurately measured the values of the data. In response to determining that the bits in the packet match the nominal values thereof, a determination is made that the phase position 130 at which the bits were measured satisfies an accuracy threshold. In some embodiments, the accuracy threshold is satisfied when the bits in the packet match the pattern, while in other embodiments the accuracy threshold may specify that the bits are compared to the pattern multiple times. For example, a phase position 130 may be tested in several eyes 120 with different data or different signal characteristics (e.g., various amplitudes, waveforms, frequencies) and the accuracy threshold is not satisfied until the bits are determined to match the pattern at the given phase position 130 for each of the characteristics tested.

In some embodiments, the measured values of the bits are evaluated against more than one pattern of nominal values in parallel. For example for a 1/n (e.g., half-rate: ½) rate sampling, n (e.g., two) patterns of nominal values are evaluated in parallel against the measured values to determine whether the measured values match one of the n patterns. In response to the measured values matching one of the patterns, the state logic 231 may determine that the values were accurately measured for the associated phase position 130. In response to the measured values not matching one of the patterns, the state logic 231 may determine that the associated phase position 130 did not accurately measure the values of the bits. As discussed herein, the inaccurate measurement of the values of the bits in inherent to the blur region or edge 140 in the eyes 120, and the state logic 231 will evaluate several phase positions 130 in sequence to determine whether a given channel passes BIST.

As will be appreciated, the length of the pattern against which the measured values are evaluated serves as an accuracy threshold, with longer patterns reducing the risk of a false positive match. For example, with a sampler 214 that assigns a binary value of TRUE at 1V and FALSE a 0V, a signal amplitude of 0.5V may have an equal chance of being evaluated as TRUE or FALSE. The probability that the sampler 214 in the above scenario presented with a series of n bits at 0.5V matching a pattern can therefore be expressed as $1 \div 2^x$, where x is the number of bits in the pattern of nominal values. One of ordinary skill in the art will therefore appreciate that patterns of different lengths may be used to apply different accuracy thresholds for the measurement of whether a given phase position 130 can be used to accurately measure the value of a signal 110.

Once a determination has been made for a given phase position 130 regarding whether an accuracy threshold has been satisfied for measuring the series of bits, the state logic 231 may signal the phase rotator control logic 221 to advance the phase rotator to the next phase position 130. In response to advancing the phase rotator to the next phase position 130, an additional packet is generated for the state logic 231 to evaluate the performance of the next phase position 130 in accurately measuring the data carried in the signal 110 against the nominal values thereof. For a phase rotator having n phase positions 130, the state logic 231 may signal up to 1.5 n times to advance the phase rotator to the next phase position 130 when evaluating a given channel to thereby test up to three eyes 120.

The state logic 231 tracks a maximum count (also referred to as a "max count" "$count_{max}$" or similar) of sequential phase positions 130 that satisfy the accuracy threshold for each pattern against which the measured values are evaluated. The maximum count represents a highest observed count of the sequential phase positions 130 that were determined to satisfy the accuracy threshold for a give pattern. Stated differently, each packet in which every bit has been positively evaluated by the state logic 231 as matching a given pattern increments a current count for that pattern, and each packet in which at least one bit is negatively evaluated resets the current count for the width of all of the eyes 120, and the maximum count is the largest value seen for a given channel. For example, if a first packet measured at a first phase position 130a is evaluated as matching $pattern_A$, and a second packet measured at a second phase position 130b is also evaluated a matching $pattern_A$, a count for $pattern_A$ may be set to two. If the current count for $pattern_A$ is greater than the current $count_{max}$ for $pattern_A$, $count_{max-A}$ is updated to match the current count. Continuing the example, if a third packet measured at third phase position 130c is evaluated as matching $pattern_A$, the $count_A$ (and, in turn, the $count_{max-A}$) for $pattern_A$ increments to three. If, however, if the third packet is evaluated as matching $pattern_B$, the count for $pattern_A$ resets to zero, the $count_{max-A}$ for $pattern_A$ remains set at two, and a count for $pattern_B$ may begin incrementing.

Because the initial phase position 130 at which the signal 110 is sampled may not correspond to the initial position with an eye 120, the maximum counts for the patterns are maintained for a given channel until all of the maximum counts satisfy an eye width threshold or the phase rotator is advanced to a final position (e.g., 1.5 n times). For example, with respect to FIG. 1, the initial phase position 130 may be at phase position 130d, which corresponds to a half-way point in the first eye 120a. The maximum count for the eye width of the first eye 120a may therefore by artificially low, and therefore the first 0.5 n of the n available phase positions 130 may be tested twice to accurately determine a maximum count for each pattern evaluated, as the nominal values in the third eye 120c match those in the first eye 120a in the given example. Stated differently, each phase rotator position of the plurality of phase rotator positions induce phase shifts between 0π and 2π radians relative to an initially tested phase position 130, and the phase shifts for the phase positions 130 associated with phase shifts of between 0π and 1π radians are measured up to two times and the phase rotator positions that induce phase shifts between 1π and 2π radians relative to the initially tested phase position 130 are measured once.

Once the maximum counts associated with each pattern have satisfied an eye width threshold, and/or the phase rotator has been advanced to the maximum position (1.5 n times for a three eye 120 measurement maximum), the state logic 231 marks the channel by which the data were transmitted as passing or failing via a flag in a result register 232 associated with the channel. The state logic 231 may then advance the channel that is being evaluated from the current channel to a next channel until all channels indicated for BIST have been evaluated, at which time BIST mode may be concluded.

Figure 3:
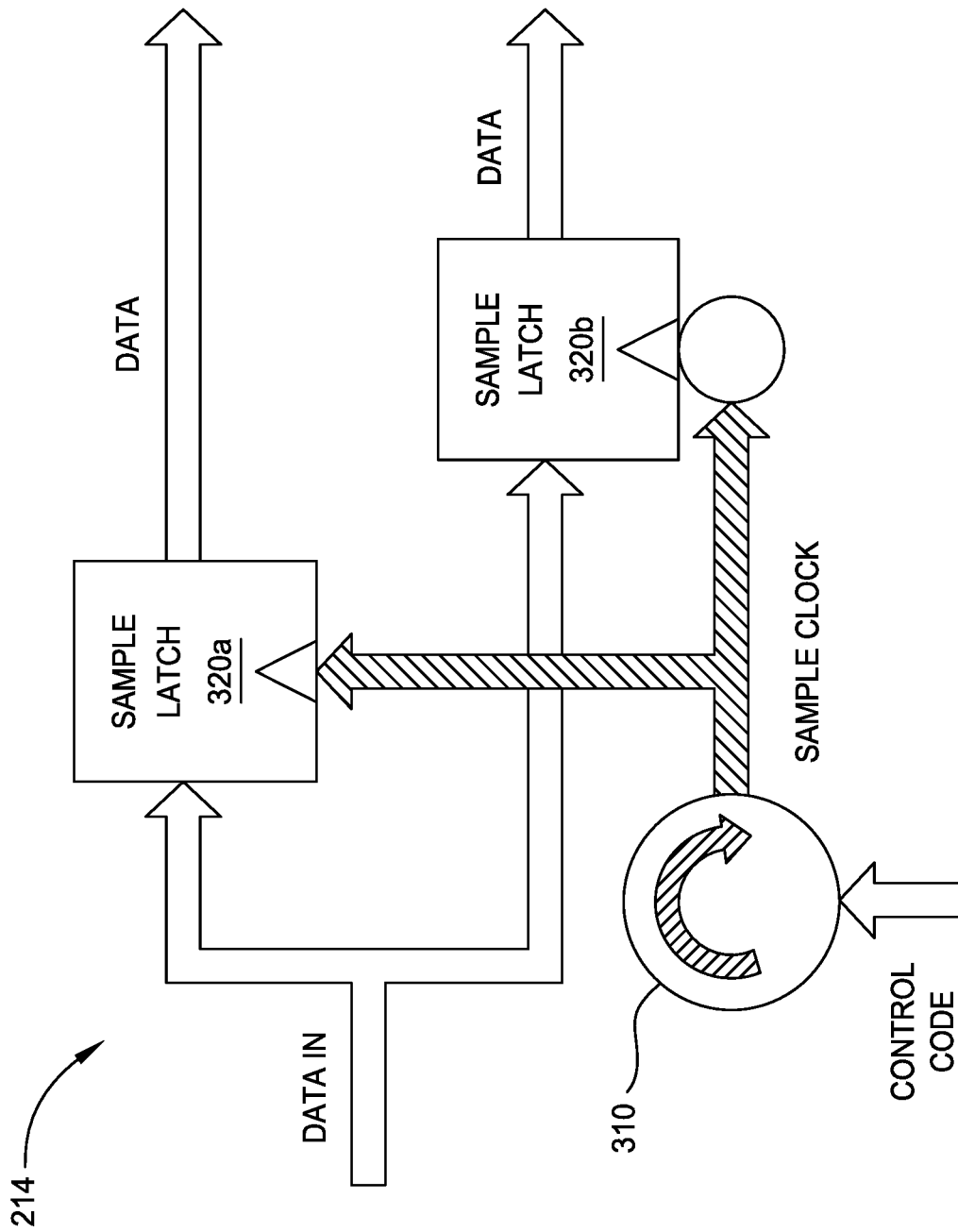
FIG. 3 illustrates details of an example sampler according to an aspect of the present disclosure.

FIG. 3 illustrates details of a portion of an example sampler 214, as may be used with the example integrated circuit 200 discussed in greater detail in regard to FIG. 2 to sample the interleaved dataset for analysis. The illustrated example sampler 214 is a half-rate sampler, receiving data in one channel and outputting data in two channels (as $Pattern_A$ and $Pattern_B$), although one of ordinary skill in the art will appreciate that other rates of samplers 214 are possible, which may result in more or fewer output channels, such as, for example, four channels for a quarter rate sampler, eight channels for an eighth rate sampler, etc.

In the illustrated example, data are received as part of a signal 110 by a first sample latch 320a and a second sample latch 320b (generally, sample latches 320), which sample the signal 110 at different times according to a sample clock signal set by a phase rotator 310. In the illustrated example, the phase rotator 310 is controlled by a control code signal (generated by phase rotator control logic 221) to induce a time offset into the sample clock signal that is independent from the data generation clock signal, thus offsetting the phase at which the signal 110 is sampled at. The first sample latch 320a is triggered to sample the signal 110 at a rising edge of the clock signal, whereas the second sample latch 320b is triggered to sample the signal 110 at a falling edge of the clock signal. By sampling the signal 110 at a rising edge and the falling edge of the sample clock signal, the sampler 214 produces a two streams of data (one from the first sample latch 320a and one from the second sample latch 320b) that are offset from one another by half of the sample clock (i.e., by of 180° or 1π radian from the neighboring bits), thus sampling the even bits of the pattern in one output and the odd bits of the pattern in the other output. As the phase rotator 310 changes the phase offsets to the samples latches 320, the given pattern carried in a given output will shift; thus the first output may carry $pattern_A$ and the second output may carry $pattern_B$ for several phase positions, but at switch occurs at a given phase offset, where the first output will carry $pattern_B$ and the second output will carry $pattern_A$.

Figure 4:
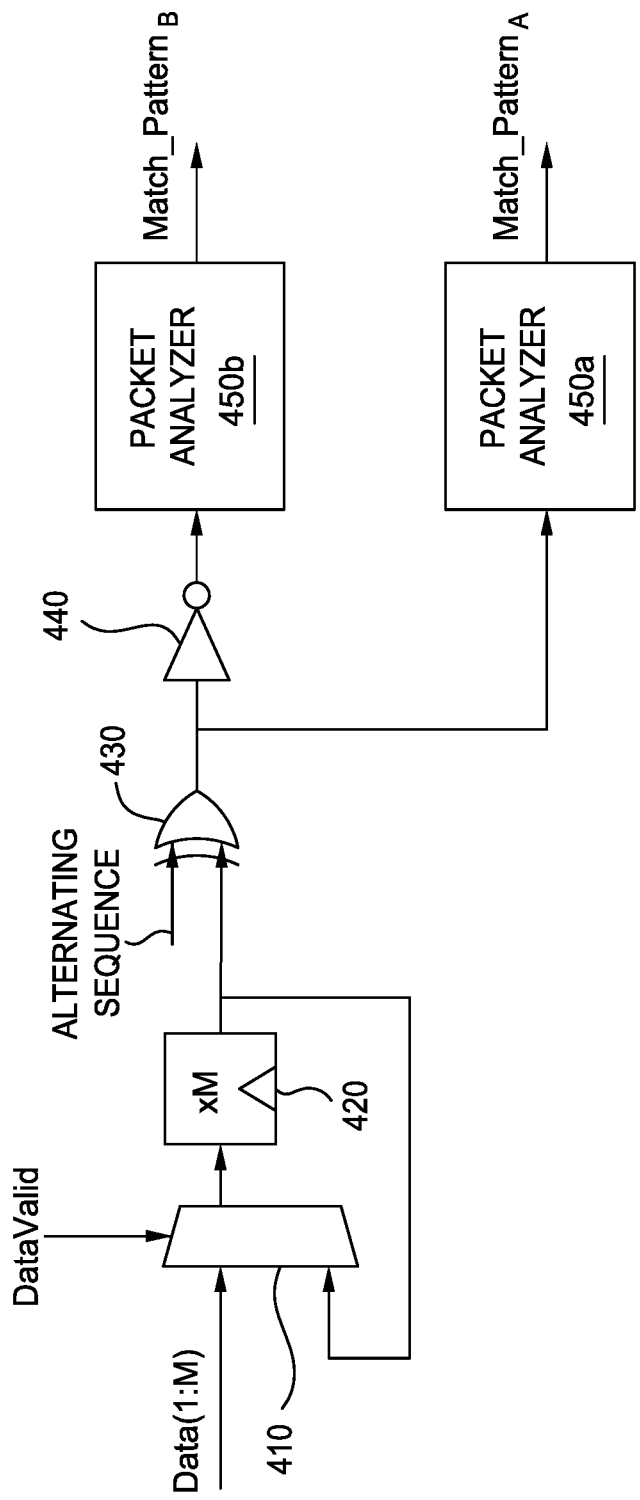
FIG. 4 illustrates details of an example state logic test according to an aspect of the present disclosure.

FIG. 4 illustrates details of an example state logic test circuit 400 as may be used with the example state logic 231 discussed in greater detail in regard to FIG. 2. The illustrated test circuit 400 receives a packet of M bits at a multiplexer 410 and a data valid signal. The data valid signal controls latch 420 so that each bit of the packet of M bits is bitwise fed back into the multiplexer 410 and into an XOR gate 430. The XOR gate 430 receives a sequence of bits with alternating values (e.g., $01010101_2$) that are compared with the values in the packet to flip the value of every other bit. For example, a six bit packet of values $010101_2$ compared against the alternating sequence of $010101_2$ would yield an output for the XOR gate 430 of $000000_2$, whereas a six bit packet of values $101010_2$ compared against the same alternating sequence would yield an output for the XOR gate 430 of $111111_2$.

In the illustrated example, the output of the XOR gate 430 is fed to a first packet analyzer 450a (generally packet analyzer 450) and to a NOR gate 440, which in turn feeds a second packet analyzer 450b the inverted output of the XOR gate 430. Each packet analyzer 450 compares the inputted series of bits against the nominal patterns for those bits to determine which pattern, if any, the packet represents.

In the illustrated example, $pattern_A$ and $pattern_B$ (the inverse of $pattern_A$) are the potential nominal values for the bits that the respective first packet analyzer 450a and second packet analyzer 450b to check the measured values against. If all of the bits in the packet match $pattern_A$, the first packet analyzer 450a will output a positive (e.g., TRUE) signal for $Match\_Pattern_A$. Similarly, if all of the bits in the packet match $pattern_B$, the second packet analyzer 450b will output a positive (e.g., TRUE) signal for $Match\_Pattern_B$. During BIST, the state logic 231 counts the number of sequential TRUE Match_Pattern signals for each pattern to determine the width of an eye 120.

The illustrated example is given in relation to a half-rate sampler, although one of ordinary skill in the art will appreciate that other sampling rates are possible. With other sample rates, the state logic 231 will track which UI is being sampled based on altering a consistent bit position in the pattern. For example, with a sampling rate of X (e.g., quarter rate, eighth rate) every $1/X^{th}$ bit may be inverted, such that with a half-rate sampler every $2^{nd}$ bit in the packet is inverted, with a quarter rate sampler every $4^{th}$ bit in the packet is inverted, with an eight rate sample every $8^{th}$ bit in the packet is inverted, etc. The alternating sequence used in such examples will therefore be different, to affect the proper inversion, and the number of packet analyzers 450 employed may also increase to comply with the sampling rate and the number of patterns analyzed.

Figure 5:
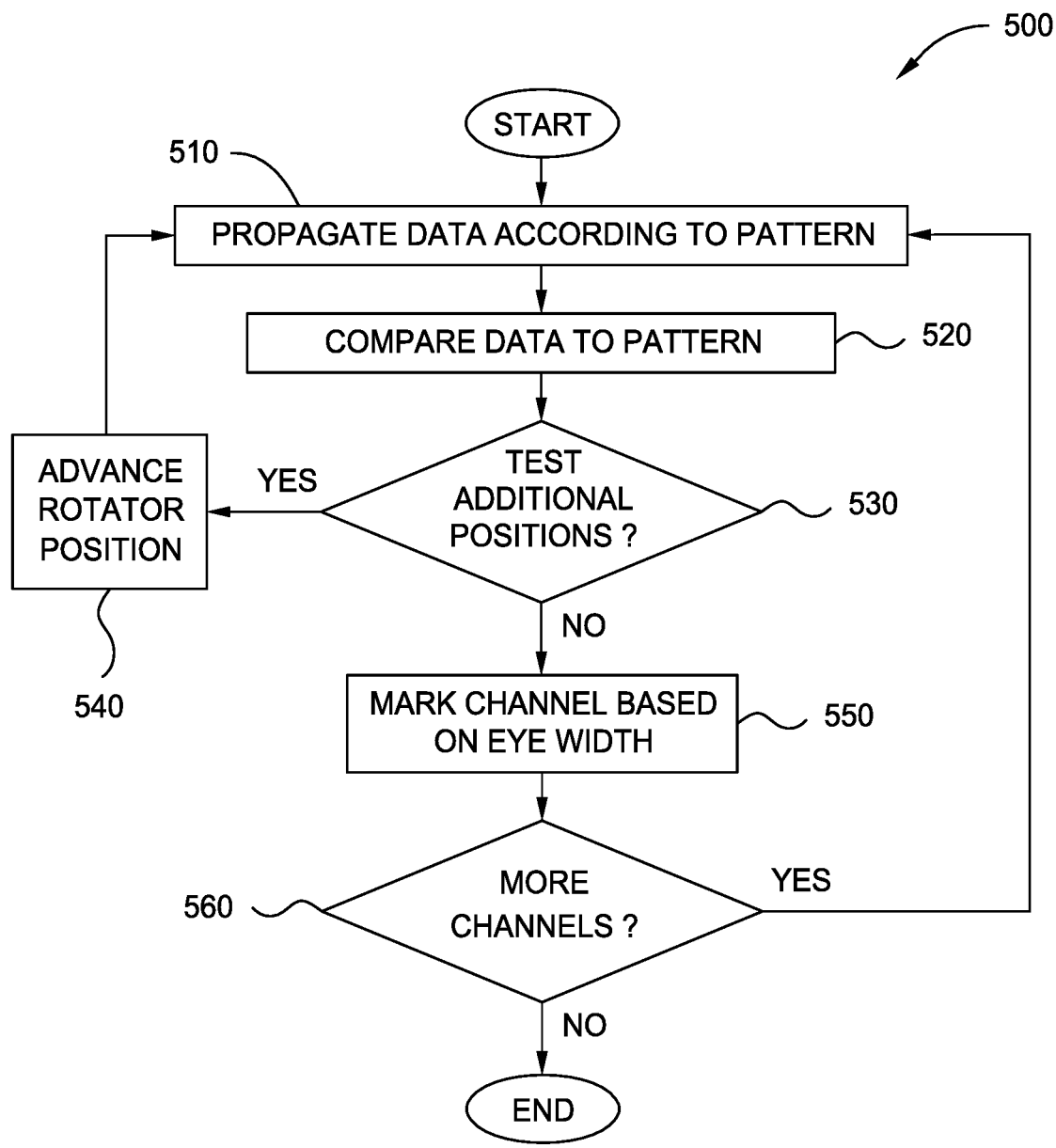
FIG. 5 is a flow chart showing general operations of an example method for providing built-in self-test according to an aspect of the present disclosure.

FIG. 5 is a flow chart showing general operations of an example method 500 for providing built-in self-test according to an aspect of the present disclosure. Method 500 begins at block 510, where a series of data is generated according to a nominal pattern and are propagated through a channel of an IC 200. In some embodiments, the pattern is a known test pattern, while in other aspects the pattern is a pseudo-random bit stream of a known length, whose values are preserved for later comparison in a test phase. In some embodiments, the data are interleaved with data of a complement value to produce a waveform that has distinct edges between each UI. In other embodiments, the even bits of the pattern conform to a first pattern and the odd bits of the pattern conform to a second pattern different from the first pattern. In yet other embodiments, more patterns may be interleaved with one another for analysis at different sampler rates.

The data are propagated through the channel undergoing BIST, and are sampled to determine measured values for the bits of the series of data. Depending on the phase offset used in conjunction with a sample clock that controls when a measurement is made, the bit measured may be an even bit or an odd bit in the series of data. For example, when using two interleaved patterns for the series of data of $10101010101010_2$, a first pattern is represented by the bits of $1111111_2$ and the second pattern is represented by the bits $0000000_2$. In another example, using four interleaved patterns for the series of data of $10101010101010001_2$, a first pattern is represented by the bits of $1111_2$, a second pattern is represented by the bits $0000_2$, a third pattern is represented by the bits $1110_2$, and a fourth pattern is represented by the bits $0001_2$. The bits are generated and measured in sequence, but are organized into a packet for analysis by the state logic 231, so that the analysis may be done independently (i.e., asynchronously) from the sample clock's rate. In some embodiments, the series of data is measured such that every other bit is inverted in value, although other patterns are contemplated.

Proceeding to block 520, the measured values of the data are compared against the nominal values for the data that were set according to the pattern. Because the phase at which the values are measured influences whether the sampler 214 measured data conforming to a first pattern or a second pattern (or a further pattern) interleaved with the series of bits, multiple comparisons are made in parallel; one for each pattern interleaved in the series of bits. For a half-rate sampler in which two patterns are interleaved in the series of bits, two comparisons are made in parallel to determine whether the measured values match one of the first pattern and the second pattern (or neither pattern).

In some embodiments, the measured values are compared to the nominal values of bits sampled at a given phase shift position of the plurality of phase shift positions to determine whether the given phase shift position 130 satisfies an accuracy threshold. As will be understood, the accuracy threshold is based on the length of the pattern against which the measured values are compared. Stated differently, an ordered series of measured values that match the pattern will satisfy the accuracy threshold, whereas an ordered series of measured values that partially matches the pattern will not satisfy the accuracy threshold.

The accuracy threshold may be set by a length of the pattern against which the measured values are compared. For example, for a pattern length of seven bits, the accuracy threshold is seven bits, and seven measured values that match the seven nominal values will satisfy the accuracy threshold. In another example, when using patterns of different lengths, a shortest pattern length may be set as an accuracy threshold. In yet another example, when using an accuracy threshold greater than the number of bits in a pattern, a given phase position 130 may be tested several times to simulate using a packet of a greater length.

At block 530 it is determined whether to test additional phase positions of the phase rotator. As several eyes 120 are tested, and measurement may start at different positions, several phase positions 130 may be tested multiple times (e.g., up to 1.5× the number of phase positions available for three eyes 120). For example, in a 64 position phase rotator, each eye 120 consists of 32 separate positions at which the phase rotator may be rotated through (i.e., up to 96 positions to test) to ensure that the eyes 120 are properly measured. A determination to test no additional phase positions 130 (i.e., a determination that sufficient phase positions 130 have been tested) may be made when the maximum number of rotations through the phase rotator have been made, when it is determined that the second eye 120b and first eye 120a or the third eye 120c have eye widths sufficient to mark the channel being tested as passing BIST, or when sufficient phase positions 130 have been tested to determine that an eye width of sufficient width for the second eye 120b or the third eye 120c cannot be possible given the number of remaining phase positions to test.

In response to a determination to test additional positions, the method 500 proceeds to block 540, where the rotator position is advanced. For example, if the phase rotator is at a first phase position 130a, it is advanced to a second phase position 130b. Each phase position 130 specifies a different time offset from the clock signal at which to measure the value of a sample. Each phase position 130 in a phase rotator with n phase positions 130 specifies a time offset $2\pi/n$ radians different from the adjacent phase positions 130. Stated differently, phase position 130n specifies an offset $+2\pi/n$ from phase position $130_{n-1}$ and $-2\pi/n$ from phase position $130_{n+1}$ for the phase rotator. By testing adjacent phase positions 130 in sequence (either rotating clockwise or counterclockwise through the available phase offsets), the state logic 231 may determine an eye width for the IC 200 undergoing BIST.

In response to a determination to not test additional positions, the method 500 proceeds to block 550, where the channel being tested is marked as either passing or failing BIST based on the width of the eyes 120 observed. The maximum count for how many consecutive phase positions were able to be matched against the respective patterns may be compared against an eye width threshold to determine whether to pass or fail a given channel for BIST. For example, in an IC 200 using a phase rotator having 64 positions (in which eyes 120 have a maximum width of 32 phase positions 130), an eye width threshold may be set to 20 consecutive matched readings so that if 20 or more readings are consecutively measured as satisfying the accuracy threshold, the channel will pass. As will be appreciated, other eye width thresholds are possible that may require larger or smaller portions of the eye 120 to satisfy the accuracy threshold.

The method 500 proceeds to block 560, where a determination is made as to whether more channels for BIST are present. In response to a determination that BIST is to be performed on more channels, the method 500 returns to block 510, where data are propagated into a new channel for BIST. In response to a determination that BIST is not to be performed on more channels, the method 500 may conclude.

Figure 6:
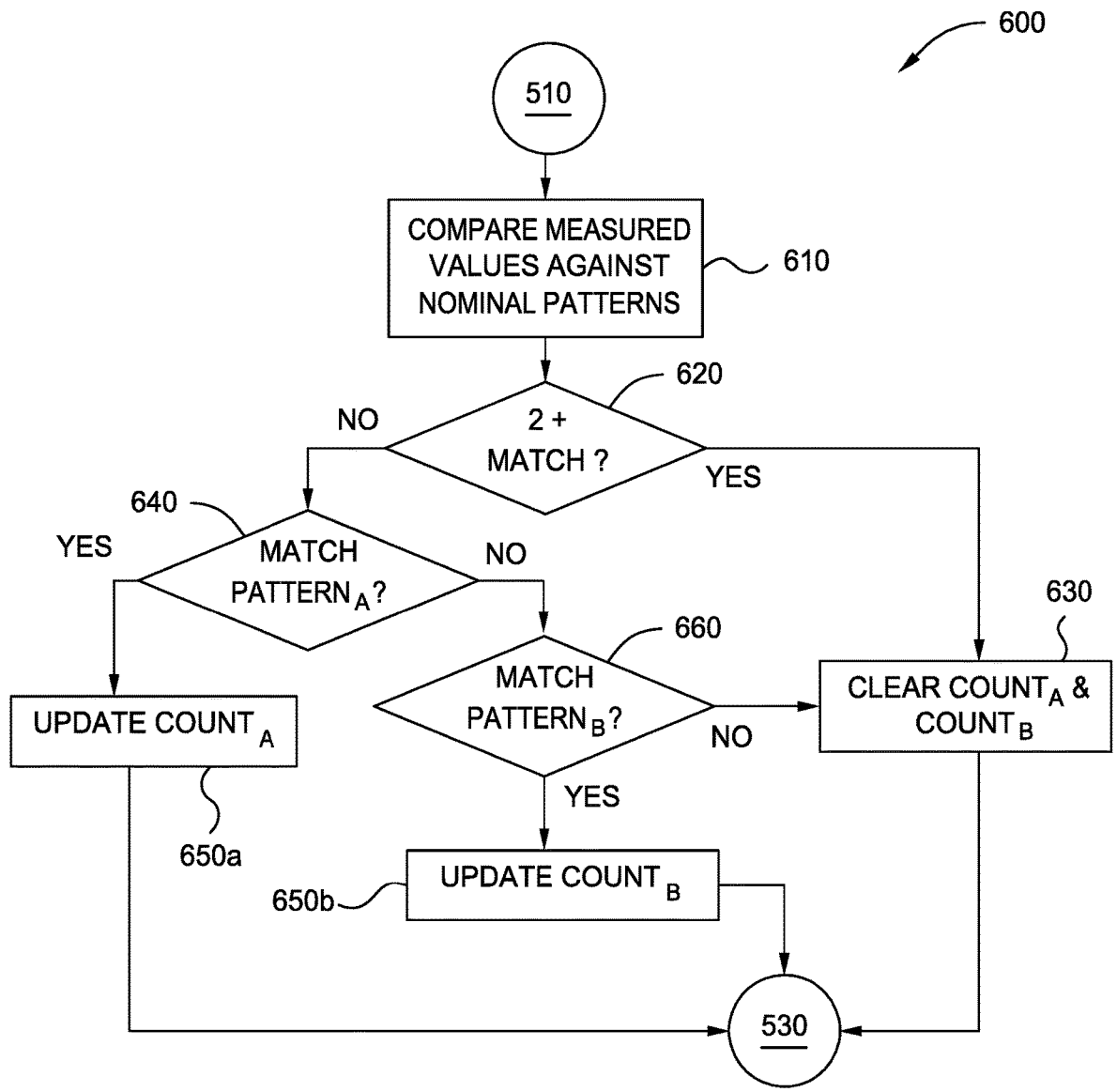
FIG. 6 is a flow chart showing general operations of an example method for comparing data against a pattern according to an aspect of the present disclosure

FIG. 6 is a flow chart showing general operations of an example method 600 for comparing data against a pattern according to an aspect of the present disclosure. In some embodiments, the method 600 discussed in relation to FIG. 6 may be performed as part of block 520 of the method 500 discussed in relation to FIG. 5. The method 600 begins with block 610, where measured data are compared against known patterns that the data nominally correspond to.

At block 620 a determination is made as to whether the measured data match both pattern$_A$ and pattern$_B$. At block 640 a determination is made as to whether the measured data match pattern$_A$. At block 660 a determination is made as to whether the measured data match pattern$_B$. In response to a determination in blocks 620, 640, and 660 that the data match both patterns or neither pattern, method 600 proceeds to block 630, where the counts associated with each pattern (e.g., count$_A$ for pattern$_A$ and count$_B$ for pattern$_B$) are cleared (i.e., reset to a value of zero). In response to a determination that the measured data match pattern$_A$, method 600 proceeds to block 650a, where the counts and/or maximum counts associated with pattern$_A$ are updated. In response to a determination that the measured data match pattern$_B$, method 600 proceeds to block 650b, where the counts and/or maximum counts associated with pattern$_B$ are updated. Each of block 650a and block 650b may be instances of method 700 (discussed in greater detail in regard to FIG. 7) associated with the registers holding values for the count and max count associated with individual patterns.

As will be appreciated, blocks 620, 640, and 660 may be executed in different orders and with different determinations to affect the overall determination of whether to clear the counts when the data match both patterns or neither pattern, or to update one of the counts associated with a pattern that the measured data is uniquely matched with. For example, when evaluating which pattern a given packet matches, a determination for whether the packet matches pattern$_A$ (per block 640) may be performed in parallel with a determination for whether the packer matches pattern$_B$ (per block 660). In another example, block 620 may be omitted if there is no possibility of the measured packet containing both pattern$_A$ and pattern$_B$, such as when the packet is evaluated after being XORed against an alternating pattern such that every other bit is inverted in value (per block 510) to provide a pattern exclusively matching one of pattern$_A$ or pattern$_B$. It will also be appreciated that additional instances of blocks 620, 640, 650, and 660 may be executed in embodiments using more than two patterns. Method 600 may conclude after clearing the counts or updating one count and proceed to block 530 of method 500.

Figure 7:
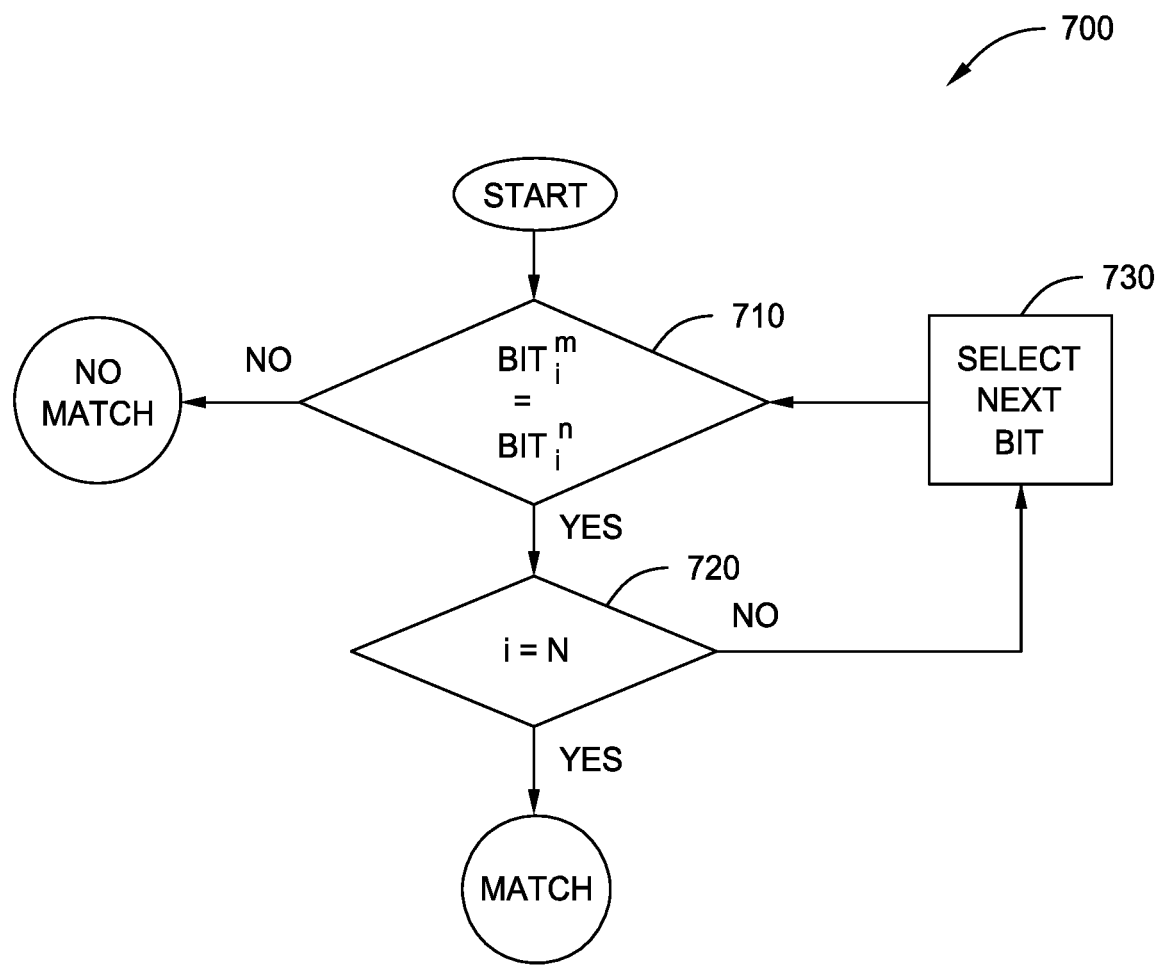
FIG. 7 is a flow chart showing general operations of an example method for testing whether a series of bits pass a built-in self-test according to an aspect of the present disclosure

FIG. 7 is a flow chart showing general operations of an example method 700 for testing whether a series of bits belongs to a first pattern or to a second pattern according to an embodiment of the present disclosure. In some embodiments, the method 700 discussed in relation to FIG. 7 may be performed as part of block 610 of the method 600 discussed in relation to FIG. 6. Multiple instances of method 700 may be run in parallel or in series for determining whether the series of bits matches multiple patterns. For example, method 700 may be executed twice in parallel to determine whether a series of bits matches a first pattern (in a first instance of method 700 checking for a match to pattern$_A$) or a second pattern (in a second instance of method 700 checking for a match to pattern$_B$). In an embodiment of the present disclosure defining pattern$_B$ as the complement to pattern$_A$, the measured data may be compared against pattern$_A$ and the compliment of the measured data may be compared against pattern$_B$ in parallel to determine whether the measured data correspond to one of pattern$_A$ or pattern$_B$.

The method 700 begins with block 710, where the measured value of bit$_i^m$ is compared against the corresponding nominal value bit$_i^n$ according to the pattern in the packet. As will be appreciated, i represents a given position of a bit within a series of bits (e.g., when i=1; bit$_1$). Method 700 begins with i set to correspond to the least significant bit in the series of bits comprising the packet, but i increments as method 700 proceeds to match subsequent bits against the pattern of nominal values. In some embodiments, bit$_i^n$ is part of the packet of bits, located at position i+N, where N is the length of the portion of each pattern to be compared against. The packet contains at least 2N bits, corresponding to at least the measured values and the nominal values set by the pattern. For example, if seven bits are measured, the packet will contain at least fourteen bits. In response to determining that the values of bit$_i^n$ and bit$_i^m$ do not match, method 700 concludes with a determination that the bits do not match the pattern. In response to determining that the values of bit$_i^n$ and bit$_i^m$ match, method 700 proceeds to block 720.

At block 720, the value of i is compared to N; the length of the portion of the pattern to be compared against. When i is equal to N, all of the bits in the series of bits that are to be compared against have been checked with no errors according to the pattern (per block 710), and method 700 may end with a passing result for the series of bits. When i is not equal to N, method 700 proceeds to block 730, where i is incremented and the measured value for the next bit$_i$ is selected for analysis against the corresponding nominal value. Method 700 then returns to block 710 to check the next bit$_i$ in the packet. For example, after checking bit$_1$ (i=1), the method 700 increments i, and checks bit$_2$ (i=2) according to blocks 710, 720, and/or 730 as described above.

Figure 8:
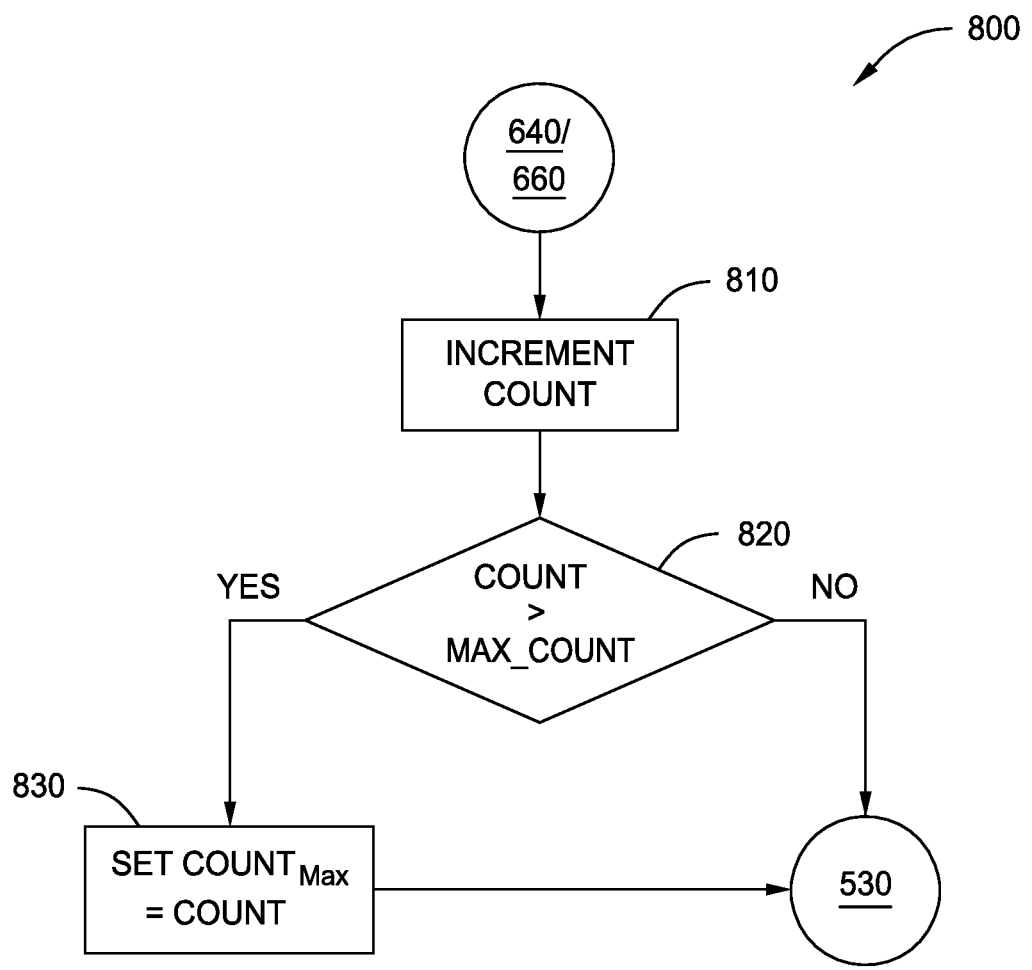
FIG. 8 is a flow chart showing general operations of an example method for updating a count for a sequence of a measurement eye according to an aspect of the present disclosure.

FIG. 8 is a flow chart showing general operations of an example method for updating a count for a sequence of a measurement eye according to an aspect of the present disclosure. In some embodiments, the method 800 discussed in relation to FIG. 8 may be performed as part of block 650a or block 650b (or another instance of block 650) of the method 600 discussed in relation to FIG. 6. Multiple instances of method 800 may be run in parallel or in series for updating a count for a sequence. For example, method 800 may be executed twice in parallel to update a count for a series of bits in a first eye 120a (in a first instance of method 800 updating count$_A$) and to update a count for a series of bits in a second eye 120b (in a second instance of method 800 checking updating count$_B$).

Method 800 begins at block 810, where a count for an identified pattern is updated. The count represents a number of phase positions 130 in a continuous sequence in a given eye 120 that conform to the expected value of one of pattern$_A$ or pattern$_B$. For example, when the data in a signal 110 are identified as conforming to the expected values of pattern$_A$, an associated count$_A$ is incremented by one (e.g., count$_A$ updates from X to X+1), whereas when the data in the signal 110 are identified as conforming to the expected values of pattern$_B$, an associated count$_B$ is incremented by one.

Proceeding to block 820, a determination is made as to whether the count associated with the identified pattern exceeds a maximum previously observed count associated with the pattern. For example, Count$_A$ is compared against Max_Count$_A$, whereas Count$_B$ is compared against Max_Count$_B$. Each of the values associated with a Count and a Max_Count, it will be appreciated, may be stored in separate registers.

In response to determining that the current Count exceeds the maximum previously observed count, method 800 proceeds to block 830, where Max_Count is set to the value seen in the current Count. For example, if Count$_A$ has a value of X+1 and Max_Count$_A$ has a value of X, Max_Count$_A$ will be set to have a value of X+1 at block 830. As will be appreciated, as the first eye 120a may be measured at an unknown initial phase position, the MaxCount$_A$ may be updated to reflect a higher value when analyzing the third eye 120c. In other embodiments that simulate a larger packet size by requiring a pattern to be matched across different eyes 120, a count or Max_Count may be combined with a Prior_Max_Count associated with measurements from a prior eye 120.

In response to determining that the current Count does not exceed the maximum previously observed count or setting Max_Count to the current count, method 800 may conclude and proceed to block 530 of method 500.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method for packeted analysis, comprising:
    testing a phase rotator at a plurality of phase rotator positions, wherein testing the phase rotator at a given phase rotator position of the plurality of phase rotator positions comprises:
        propagating a first series of bits of a first pattern through a channel of an integrated circuit;
        propagating a second series of bits of a second pattern through the channel;
        measuring, for the given phase rotator position, a value of each bit propagated through the channel; and
        in response to determining that measured values of the bits propagated through the channel conform to one of the first pattern and the second pattern, indicating that the given phase rotator position satisfies an accuracy threshold;
    determining a sequence of phase rotator positions of the plurality of phase rotator positions in which the accuracy threshold is satisfied; and
    in response to determining that the sequence of phase rotator positions does not satisfy an eye width threshold, failing the channel of the integrated circuit.

2. The method of claim 1, further comprising:
    in response to determining that the sequence of phase rotator positions does satisfy the eye width threshold, passing the channel.

3. The method of claim 1, wherein the second pattern is a compliment of the first pattern.

4. The method of claim 1, wherein the first series of bits and the second series of bits are interleaved when propagated through the channel.

5. The method of claim 4, wherein the first series of bits and the second series of bits propagated through the channel are deserialized for analysis as a packet of bits.

6. The method of claim 4, where measuring, at the given phase rotator position, the value of each bit propagated through the channel further comprises:
    inverting the values of alternate bits of the bits propagated through the channel.

7. The method of claim 1, wherein each phase rotator positions of the plurality of phase rotator positions induces a phase shift on a clock signal controlling when the value of each bit propagated through the channel is measured.

8. The method of claim 7, wherein the plurality of phase rotator positions induce phase shifts between $0\pi$ and $1\pi$ radians on the clock signal, wherein each phase rotator position of the plurality of phase rotator positions that induce phase shifts between $0\pi$ and $1\pi$ radians relative to an initially tested given phase position are measured up to two times and the phase rotator positions that induce phase shifts between $1\pi$ and $2\pi$ radians relative to the initially tested given phase position are measured once.

9. The method of claim 8, wherein the eye width threshold specifies a predetermined number of phase positions of the phase rotator that satisfy the one of the first pattern and the second pattern, wherein the predetermined number of phase positions is between 10% and 50% of a number of available phase positions of the phase rotator.

10. The method of claim 1, wherein the first pattern is generated as a Pseudo Random Binary Sequence.

11. A circuit with packeted analysis built-in self-test functionality, comprising:
    a receiver channel;
    a pattern generator, in communication with the receiver channel, that propagates a series of bits according to a pattern of nominal values during Built-In Self-Test (BIST) onto the receiver channel, wherein each bit of the series of bit has a known nominal value;
    a sampler, in communication with the receiver channel, that samples each bit propagated onto the receiver channel in response to a clock signal to sequentially determine measured values for the series of bits;
    a result register, configured to store a result signal generated during BIST;
    a phase rotator, in communication with the sampler and the result register, including a plurality of phase shift positions, wherein each phase shift position of the plurality of phase shift positions, when active, imparts a different phase shift on the clock signal;
    a test logic circuit, in communication with the pattern generator and the phase rotator, that during BIST is configured to:
        in response to setting which phase shift position of the plurality of phase shift positions is active, signal the pattern generator to propagate the series of bits;
        compare the measured values of the bits to the nominal values of the bits sampled at a given phase shift position of the plurality of phase shift positions to determine whether the given phase shift position satisfies an accuracy threshold; and
        determine whether a number of sequential phase shift positions of the plurality of phase shift positions that satisfy the accuracy threshold satisfy an eye width threshold.

12. The circuit of claim 11, wherein the pattern generator interleaves a complement of the pattern of nominal values with the pattern of nominal values.

13. The circuit of claim 12, wherein the accuracy threshold specifies a number of bits in sequence that have measured values that match one of the pattern and the complement of the pattern.

14. The circuit of claim 11, wherein the plurality of phase shift positions include N phase shift positions, and the test logic circuit is further configured to control the phase rotator to activate 1.5N times to thereby sample the series of bits twice for 0.5N of the phase shift positions.

15. The circuit of claim 11, wherein the eye width threshold is satisfied in response to the number of sequential phase shift positions exceeding 0.2N of the phase shift positions.

16. The circuit of claim 11, wherein the test logic circuit receives the series of bits as a packet of bits for analysis asynchronously of the clock signal.

17. The circuit of claim 11, wherein the pattern generator is Pseudo-Random Binary Sequence Generator.

18. The circuit of claim 11, further comprising:
    a second receiver channel, in communication with the pattern generator and the sampler;
    wherein the test logic circuit is further configured to select one of the receiver channel and the second receiver channel to perform BIST on.

19. The circuit of claim 18, further comprising:
a second result register, in communication with the test logic circuit;
wherein the receiver channel is associated with the result register to store the result signal generated during BIST of the receiver channel; and
wherein the second receiver channel is associated with the second result register to store a result signal generated during BIST of the second receiver channel.

20. A method for packeted analysis built-in self-test, comprising:
comparing a sequence of measured values for a series of bits against a sequence of nominal values for the series of bits, wherein the sequence of measured values are sampled from a signal according to a sample clock signal phase shifted according to an active phase shift position of a plurality of phase shift positions;
determining that a given phase shift position of the plurality of phase shift positions satisfies an accuracy threshold in response to the sequence of measured values matching the sequence of nominal values; and
determining whether a number of phase shift positions of the plurality of phase shift positions satisfy an eye width threshold based on a number of sequential phase shift positions of phase shift positions satisfying the accuracy threshold.

* * * * *